United States Patent [19]

Overend et al.

[11] Patent Number: 5,324,762
[45] Date of Patent: Jun. 28, 1994

[54] PLASTISOL COMPOSITIONS

[75] Inventors: Andrew S. Overend, Warrington; John C. Padget, Frodsham, both of England

[73] Assignee: Imperial Chemical Industries PLC, London, United Kingdom

[21] Appl. No.: 964,871

[22] Filed: Oct. 22, 1992

[30] Foreign Application Priority Data

Oct. 24, 1991 [GB] United Kingdom ............... 9122594

[51] Int. Cl.$^5$ ................. C08L 33/08; C08L 33/10; C08L 33/12
[52] U.S. Cl. ........................ 524/296; 524/293; 524/297; 524/299; 524/314; 524/548; 524/555; 524/556; 524/558; 524/561
[58] Field of Search ............... 524/297, 561, 293, 296, 524/299, 314, 548, 555, 556, 558

[56] References Cited

U.S. PATENT DOCUMENTS

| 4,199,486 | 4/1980 | Boessler et al. | 525/309 X |
| 4,210,567 | 7/1980 | Kösters | 524/561 X |
| 4,309,331 | 1/1982 | Graham | 524/561 |
| 4,370,460 | 1/1983 | Neubert et al. | 524/561 X |
| 4,558,084 | 12/1985 | Quis et al. | 524/294 |

FOREIGN PATENT DOCUMENTS 2529732  2/1977  Fed. Rep. of Germany.

*Primary Examiner*—Judy M. Reddick
*Attorney, Agent, or Firm*—Cushman, Darby & Cushman

[57] ABSTRACT

The subject of this invention is acrylic polymer plastisol compositions, wherein the acrylic polymer component of the plastisol composition is a single-stage methyl methacrylate copolymer derived from methyl methacrylate and a comonomer component comprising isobutyl methacrylate and optionally other comonomer(s). The selection of isobutyl methacrylate as a comonomer with the methyl methacrylate results in good compatibility with a wide range of plasticizers and without undue softness in the resulting plastisol.

10 Claims, No Drawings

PLASTISOL COMPOSITIONS

The present invention relates to an acrylic polymer plastisol composition.

Plastisols are well known in the art. They are understood to be nonaqueous fluid compositions ranging in viscosity from pourable liquids to heavy pastes which contain a particulate polymer (polyvinyl chloride being historically the most important example) dispersed in a nonvolatile liquid organic plasticiser material which is compatible with the polymer. Under ordinary conditions of storage (ambient temperatures) the polymer does not dissolve to any extent in the plasticiser but on heating the plastisol composition at an appropriate elevated temperature, after forming the plastisol into a desired shape (e.g. by moulding or coating), the plastisol composition gels to form a homogenous coalesced mass which retains its homogenous character permanently on cooling. The presence of the plasticiser provides desirable properties to the polymer of the plastisol, particularly workability prior to gelling and flexibility after gelling. The plastisols may (and usually do) contain other materials, particularly inorganic or carbonaceous fillers.

Historically, polyvinyl chloride has been the prime example of the polymer to be used for plastisol compositions because of its particular suitability for this type of composition, and indeed the art of plastisol technology has been largely built up around the use of this particular polymer. Nevertheless polyvinyl chloride does have certain disadvantages, such as a tendency to be rather sensitive to light (leading to yellowing) and to release hydrogen chloride on aggressive heating (leading to corrosion effects on substrates such as metals).

Alternatives to the use of polyvinyl chloride as the particulate polymer in plastisol compositions have therefore been sought by the industry, and in particular acrylic polymers have been proposed and used for this purpose.

For example, it is disclosed in U.S. Pat. No. 4210567 to employ as the polymeric component for plastisols acrylic polymers based principally either on homopolymers of methyl methacrylate or copolymers of methyl methacrylate with methacrylates of aliphatic C2 to C10 (preferably C2 to C4) alcohols or acrylates of C1 to C10 (preferably C1 to C4) alcohols. In order to achieve improved stability in the plastisol on storage, it is further disclosed in GB 1581493 to use for plastisols an acrylic polymer component the particles of which have a core/shell construction; the core comprises a plasticiser—compatible homo or copolymer derived from various possible alkyl ($\geq 3$ C) acrylates, alkyl ($\geq 2$ C) methacrylates, and also styrene, and the shell comprises a plasticiser—incompatible polymer component which is very rich in methyl methacrylate ($\geq 80$ weight %).

It is well known from the prior art that acrylic polymers based on methyl methacrylate (the favoured monomer for this purpose) do require the presence of copolymerised units of a suitable comonomer, such as an alkyl acrylate or a higher alkyl methacrylate, in order for the acrylic polymer to be acceptably compatible with the plasticiser (i.e. to form a homogeneous gelled mass on heating which is stable on cooling and does not later exude liquid plasticiser). Moreover, in order for such an acrylic polymer to be compatible with less expensive plasticisers, such as dioctyl phthalate, diisononyl phthalate, diisodecyl phthalate, dioctyl adipate, and diisodecyl adipate, it is known to be necessary to incorporate very high levels of the comonomer into the methyl methacrylate polymer, e.g. up to 50 or 60 weight %. Unfortunately, the presence of such high levels of compatibilising comonomer in the methyl methacrylate copolymer in itself incurs a disadvantage, namely that the acrylic polymer tends to be unacceptably soft, and imparts undesirable properties to the resulting gelled plastisol such as poor mechanical properties, low scratch resistance and tackiness.

We have now discovered that the choice of isobutyl methacrylate as a compatibilising comonomer of a single stage methyl methacrylate copolymer uniquely allows one to achieve excellent compatibility with less expensive plasticisers, such as those mentioned above, while at the same time not incurring an unacceptable softening of the resulting acrylic polymer.

According to the present invention there is provided an acrylic polymer plastisol composition, wherein the acrylic polymer component of the plastisol composition is a single-stage methyl methacrylate copolymer derived from methyl methacrylate and a comonomer component provided by isobutyl methacrylate and optionally other comonomer(s), where the level of methyl methacrylate used in the polymerisation to form the copolymer is within the range of from 20 to 70 weight %, the level of isobutyl methacrylate used in the polymerisation to form the copolymer is within the range of from 30 to 80 weight %, and the level of comonomer(s) other than isobutyl methacrylate used in the polymerisation to form the copolymer is within the range of form 0 to 48 weight %, said levels being based on the total weight of monomers used for the polymerisation.

By a single-stage polymer is meant that the polymer is formed essentially in a single stage of polymerisation (although this could if desired include feeding all or part of the monomers used to the reaction vessel during polymerisation, as well as having all the monomers to be used in the reaction vessel at the start of the polymerisation, and includes seeded polymerisation) and expressly excludes two-stage systems comprising core and shell polymer components, as described in the above-mentioned GB1581493. (Polymers made by seeded polymerisation are not considered herein to be examples of core-shell polymers: in a seeded polymerisation the seed fraction does not substantially alter the properties of the resulting polymeric material per se; rather its purpose is to control the actual polymerisation process (e.g. final particle size) and hence the seed fraction will not constitute a significant part of the final polymer—e.g. not more than 20 weight % and usually much less; furthermore the said fraction will have exactly or substantially the same compositional make-up as the non-seed portion of the polymer).

The effect of isobutyl methacrylate appears to be unique in allowing one to achieve compatibility with cheap plasticisers by using a high level of the comonomer in the methyl methacrylate copolymer while not incurring unacceptable softness in the copolymer and concomitant poor properties in the resulting fabricated plastisol.

We believe this unique effect achieved with isobutyl methacrylate had not before been recognised or disclosed in the prior art. For example, while U.S. Pat. No. 4210567 discloses (inter alia) the use of methyl methacrylate copolymers in which the comonomer comprises a C2-4 alkyl methacrylate, the preferred alkyl methacrylate is said to be n-butyl methacrylate and is the only alkyl methacrylate which is exemplified. GB 1581 493, it is true, does disclose a core/shell acrylic polymer system in which, in a single example (no. 23), there is disclosed as the core polymer component an acrylic polymer derived from 20 weight % methyl methacrylate and 80 weight % isobutyl methacrylate. However, as explained above, such a copolymer is used in conjunction with a high methyl methacrylate—containing shell polymer component for the purpose of improving plastisol shelf stability and there is no intention that it should be used alone as a single-stage polymer component for the plastisol (as in the present invention). Thus GB 1581493 is concerned with the solution of a different problem to that addressed by the present invention, and the problem of achieving an acceptable combination of good combatibility and non-softness when using a wide variety of plasticisers with single-stage acrylic polymers (as in the present invention) is not applicable in any of the polymer systems of GB 1581493, where the presence of a methyl methacrylate-rich shell component of the polymer particles confers non-softness irrespective of the core composition.

Still further, there is disclosed in GB 2167 426 a plastisol of improved metal adhesion comprising a methyl methacrylate homo - or copolymer, a plasticiser, a filler, a blocked isocyanate and a polyamine. The preferred comonomer for the methyl methacrylate is said to be butyl methacrylate, but no indication is given as to which isomer is intended (normal, iso, or tertiary); however, in view of the predominant use of n-butyl methacylate in the prior art (when selecting a butyl methacrylate) the skilled man would be entitled to assume that the n-butyl isomer is intended.

The preferred level of methyl methacrylate used for making the acrylic polymer is from 20 to 60 (more preferably 25 to 60) weight %, the preferred level of isobutyl methacrylate is from 40 to 80 (more preferably 40 to 75) weight % and the preferred level of optional other comonomer(s) is from 0 to 40 weight % (more preferably 0 to 35 weight %).

While it is possible in principle for the acrylic polymer to be derived only from methyl methacrylate and isobutyl methacrylate, the monomer system used to make the methyl methacrylate copolymer does usually also include one or more olefinically unsaturated free-radically polymerisable comohomers other than isobutyl methacrylate.

Particularly useful examples of such other comohomers are adhesion—promoting monomers, examples of which include acrylic and methacrylic monomers having at least one free carboxyl, hydroxyl, epoxy or amino group, such as acrylic acid and methacrylic acid (and also their nitriles, hydroxyalkyl esters and amino alkyl esters) glycidyl acrylate and glycidyl methacrylate; other adhesion - promoting monomers include heterocyclic vinyl compounds such as vinyl pyrollidone and vinyl imidazole. Such monomers when used are normally used in an amount of from 0.1 to 10 weight %, more usually from 0.1 to 5 weight % of the monomers used for the polymerisation.

Other types of optional comonomer(s) which may be used are those without functional groups such as those present in adhesion-promoting monomers, examples of which include alkyl acrylates (particularly C1 to C4 alkyl acrylates such as methyl acrylate, ethyl acrylate and n-butyl acrylate), alkyl methacrylates other than isobutyl methacrylate (particualrly C2 to C4 alkyl methacrylates such as ethyl methacrylate, n-propyl methacrylate, and n-butyl methacrylate), acrylonitrile, butadiene, styrene and substituted styrenes such as α-methyl styrene. Such comohomers are usually present at a level of from 0 to 25 weight % (more usually 0 to 10 weight %) of the monomers used for the polymerisation; however frequently they are not employed at all, i.e. their level often being zero.

Accordingly, especially preferred acrylic copolymers for use in the invention plastisol compositions are derived from: methyl methacrylate used at a level of from 25 to 59.9 weight % (more usually 25 to 55 weight %); isobutyl methacrylate used at a level of from 40 to 74.9 weight % (more usually 40 to 70 weight %); at least one comonomer selected from acrylic and methacrylic monomers having at least one carboxyl, hydroxyl, epoxy or amino group and heterocyclic vinyl compounds used at a level of from 0.1 to 10 weight % (more usually 0.1 to 5 weight and optionally at least one monomer selected from C1 to C4 alkyl acrylates, C2 to C4 alkyl methacrylates other than isobutyl methacrylate, acrylonitrile, butadiene, styrene and substituted styrenes used at a level of from 0 to 25 weight % (more usually 0 to 10 weight % and very often zero).

The glass transition temperature (Tg) of acrylic polymer used in the invention is preferably within the range of from 40° to 110° C., more preferably 50° to 95° C., and particularly 70° to 95° C. (as measured by techniques such as differential scanning calorimetry, or as estimated empirically from the Fox equation).

The number average molecular weight of the defined acrylic polymer will normally be within the range of from 40,000 to 2,000,000. It may be made by conventional emulsion or suspension free-radical polymerisation in an aqueous medium, with aqueous emulsion polymerisation being preferred. It may be isolated using techniques such as coagulation and spray drying. The particle morphology of the particulate acrylic polymer (e.g. surface area, powder particle size and distribution, and porosity) should be such that the plastisol has acceptable viscosity stability prior to use (e.g. during storage).

The level of the plasticiser used in the plastisol composition will normally be within the range of 30 to 400 parts by weight per 100 parts by weight of acrylic polymer, more usually 50 to 200 parts by weight of acrylic polymer. Conventional filler materials can be incorporated into the plastisol composition up to 400, preferably up to 200, parts by weight, per 100 parts by weight of acrylic polymer.

It will be appreciated that the higher the level of a particular plasticiser in a plastisol composition, the higher the minimum level of compatibilising monomer that will be required to achieve polymer compatibility with that plasticiser (and vice versa). Such minimum levels may of course vary with the individual plasticisers concerned.

Other additives such as viscosity regulators (e.g. emulsifiers and silicones), corrosion inhibitors, dyes, pigments, heat and light stabilisers, and foaming agents (for making foamed plastigels) may also be included if desired. In some embodiments, crosslinking agents may be included, such as multiethylenically unsaturated compounds such as di, tri or tetra (meth)acrylate compounds, epoxy resins, and polyfunctional isocyanates. The use of some types of adhesion-promoting monomers in the acrylic polymer, e.g. acrylic or methacrylic monomer(s) having carboxy, hydroxyl, amino or epoxy groups, will also provide the basis of crosslinkability in the polymer.

A whole gamut of plasticisers made by employed, ranging from the inexpensive types mentioned above to more expensive materials such as butylbenzyl phthalate, dibutoxyethyl phthalate, octylbenzyl phthalate and diisoheptyl phthalate. Suitable fillers include chalks (calcium carbonate) which can e.g. be ground, precipitated or coated, barite, kaolin, silica (or sand), talc, bentonire, glass powder, alumina, titanium dioxide, graphite and carbon black.

The plastisols of the invention find application e.g. as abrasion and corrosion inhibiting coatings for steel substrates, such as underbody antichip coatings for automobiles, trucks and buses. Other applications include coil coatings, sealing gaskets for caps and closures of containers (particularly in food applications) and (when used in the form of an organsol with an added volatile organic softener) as metal container (can) interior coatings.

The present invention is now further illustrated by reference to the following examples. Unless indicated to the contrary all parts, percentages and ratios are on a weight basis. The prefix C before an example indicates that it is a comparative example.

In the examples, the following abbreviations are used:
MMA—methyl methacrylate
i-BMA—iso-butyl methacrylate
n-BMA—n-butyl methacrylate
MAA—methacrylic acid
AA—acrylic acid
DIDP—diisodecylphthalate
DINP—diisononylphthalate
DOP—dioctylphthalate
DIHP—diisohexylphthalate
OBP—octylbenzylphthalate
DSC—differential scanning calorimetry

GENERAL PROCEDURE FOR THE PREPARATION OF ACRYLIC POLYMERS 3250 g of demineralised water were charged into a 10 litre reaction vessel equipped with a stirrer, reflux condenser, thermometer, nitrogen purge, 150 ml and 500 ml graduated dropping funnels. The water was heated to 80°±2° C. and then 350 ml of monomer feed (A) was added; when the reaction temperature reached 80°±2° C. again, 120 ml of the initiator solution (B) were added.

Monomer Feed (A)

3200 g of monomer (see Table I)
12.8 g of sodium dioctylsulphosuccinate (75% aq solution) (emulsifier).

Initiator Feed (B)

2.08 g of potassium persulphate
500 g of demineralised water.

The onset of polymerisation was marked by an exotherm of approximately 5° C. After the exotherm was complete and the reaction temperature had returned to 80°±2° C. (ca. 30 mins) the remaining monomer feed (A) and 320 ml of the initiator feed (B) were fed at a constant rate over 3 hours. Then the final 60 ml of initiator feed (B) was added as a monomer burn-up stage. The polymer-latex produced was cooled to room temperature and filtered through a 50 μm sieve.

The polymer-latex was converted to a finely divided dry polymer by spray drying using conditions which avoided severe sintering of the primary latex particles.

EXAMPLES 1 TO 7

Plastisols were prepared from acrylic powders (prepared as described above), various plasticizers and ground calcium carbonate filler. The formulation for each plastisol was 40/70/70 parts polymer/plasticizer/filler. The plastisol compositions were prepared by dispersing the polymer powder and filler in the plasticizer using a high shear speed mixer. The plastisol was then homogenized on a three roll mill and finally, deairated under vacuum.

To test the compatibility of the plasticizer, a 1.5 mm film of the plastisol was coated onto a sheet of waxed paper and gelled in the oven at 160° C. for 30 minutes. If no exudation of the plasticizer from the coating was detected after 7 days storage at room temperature then the composition was deemed compatible. The compatibility results are given in Table 1.

TABLE I

| Example No | Monomer Composition used for Polymer Production | Polymer Tg (°C.) | Plasticizer Compatibility | | | | |
|---|---|---|---|---|---|---|---|
| | | | OBP | DIHP | DOP | DINP | DIDP |
| 1 | 69%MMA, 30%i-BMA, 1%MAA | 102 | / | X | X | X | X |
| 2 | 59%MMA, 40%i-BMA, 1%MAA | 92 | / | / | / | X | X |
| 3 | 49%MMA, 50%i-BMA, 1%MAA | 89 | / | / | / | / | / |
| 4 | 39%MMA, 60%i-BMA, 1%MAA | 85 | / | / | / | / | / |
| 5 | 29%MMA, 70%i-BMA, 1%MAA | 79 | / | / | / | / | / |
| 6 | 48%MMA, 50%i-BMA, 2%AA | 94 | / | / | / | / | / |
| C7 | 49%MMA, 50%n-BMA, 1%MAA | 70 | / | / | / | / | / |

Key:
/ = compatible;
X = incompatible;
Tg = glass transition temperature (DSC onset, heating rate 2% min).

It was found that increasing the i-BMA content of copolymers increased the compatibility of the acrylic copolymer with the plasticiser. Thus, the copolymers containing ≧50% i-BMA were compatible with all the plasticisers employed in this particular plastisol formulation as was a copolymer containing 50% n-BMA.

The advantageous nature of the invention plastisols containing i-BMA rather than n-BMA as the plasticiser compatibilising comonomer, was demonstrated by measuring the textile strength, scratch hardness and surface tack of gelled plastisols derived from the same acrylic polymers employed in the above Examples 3 and 7, i.e. identical polymers except for the use of i-BMA in the polymer used in Example 3 and n-BMA in the polymer used in Example 7. The plastisol compositions were prepared by dispersing 100 parts of polymer powder in 100 parts of DIDP using a high shear speed mixer. The plastisol was then homogenized on a three roll mill and, finally, deairated under vacuum.

To determine the tensile strength and surface tack a 1.5 mm film of the plastisol was coated onto a sheet of waxed paper and gelled in the oven at 160° C. for 30 minutes. The tensile strength was determined using a tensometer at a crosshead speed of 50 mm/minute.

Surface tack of the gelled plastisol films was measured using the following 'loop tack test'. A 35 mm wide by 125 mm long strip of the gelled film was cut. Both ends of the strip were clamped in the upper jaw of a tensometer (Instron 4301) such that a loop was formed. The loop was lowered onto a stainless steel plate (degreased with heptane), placed horizontally in the lower jaw, until a contact area of 25 mm by 25 mm with the plate was made. The film was then separated from the plate at a crosshead speed of 500 mm/minute and the maximum force (in Newtons) to separate the film was reported as an average of three measurements.

To determine scratch hardness of the gelled plastisols, mild steel panels were coated (300 μm thick) with the plastisol composition and gelled at 160° C. for 20 minutes. The scrach hardness was determined in accordance with the British Standard test method (BS 3900 part E2, 1970).

TABLE II

| Example No | Monomer Composition used for Polymer Production | Tensile Strength (MPa) | Scratch Hardness | Loop tack (N) |
|---|---|---|---|---|
| 8 | 49%MMA, 50%i-BMA, 1%MAA | 1.45 | 500 g | 0.1 |
| C9 | 49%MMA, 50%n-BMA, 1%MAA | 0.36 | 250 g | 1.1 |

It will be noted that the acrylic polymer containing i-BMA had a considerably superior combination of plasticiser compatibility/non-softness behaviour in comparison to the acrylic polymer containing n-BMA.

We claim:

1. Acrylic polymer plastisol composition, wherein the acrylic polymer component of the plastisol composition is a single-stage methyl methacrylate/isobutyl methacrylate copolymer derived from methyl methacrylate and a comonomer component provided by isobutyl methacrylate and optionally other comonomer(s), where the amount of methyl methacrylate used in the polymerisation to form the copolymer is within the range of from 20 to 70 weight %, the amount of isobutyl methacrylate is within the range of from 30 to 80 weight %, and the amount of comonomer(s) other than isobutyl methacrylate is within the range of from 0 to 48 weight %, said amounts being based on the total weight of monomers used for the polymerisation.

2. Acrylic polymer plastisol composition according to claim 1 wherein said methyl methacrylate amount is within the range of from 25 to 60 weight %, said isobutyl methacrylate amount is within the range of from 40 to 75 weight %, and said other comonomer(s) amount is within the range of from 0 to 35 weight %.

3. Acrylic polymer plastisol composition according to either claim 1 or claim 2 where said other comonomer(s) are selected from C1 to C4 alkyl acrylates, C2 to C4 alkyl methacrylates other than isobutyl methacrylate, styrene, substituted styrenes, acrylonitrile, butadiene, acrylic and methacrylic monomers having at least one carboxyl, hydroxyl, epoxy or amino group, and heterocyclic vinyl compounds other than epoxide-containing vinyl compounds.

4. Acrylic polymer plastisol composition according to claim 3 wherein said acrylic copolymer is derived from: methyl methacrylate used in an amount within the range of from 25 to 59.9 weight %; isobutyl methacrylate used in an amount of from 40 to 74.9 weight %; at least one monomer selected from acrylic and methacrylic monomers having at least one carboxyl, hydroxyl, epoxy or amino group and heterocyclic vinyl compounds used in an amount of from 0.1 to 10 weight %; and optionally at least one monomer selected from C1 to C4 alkyl acrylates, C2 to C4 alkyl methacrylates other than isobutyl methacrylate, acrylonitrile, butadiene, styrene and substituted styrenes used in an amount of from 0 to 25 weight %.

5. Acrylic polymer plastisol composition according to claim 4 wherein the amount of said optional monomer is zero.

6. Acrylic polymer plastisol composition according to claim 4 wherein said acrylic polymer has a glass transition temperature within the range of rom 40° to 110° C.

7. Acrylic polymer plastisol composition according to claim 4 wherein the level of plasticiser in said composition is within the range of from 30 to 400 parts by weight per 100 parts of acrylic polymer.

8. Acrylic polymer plastisol composition according to claim 4 wherein the plasticiser in said composition is selected from dioctyl phthalate, diisononyl phthalate, dissodecyl phthalate, dioctyl adipate, diisohexyl phthalate, diisononyl adipate, butylbenzyl phthalate, dibutoxyethyl phthalate, octylbenzyl phthalate, and diisoheptyl phthalate.

9. Acrylic polymer plastisol composition according to claim 4 wherein said plastisol composition includes a filler material.

10. Acrylic polymer plastisol composition according to claim 4 in the form of abrasion and corrosion inhibiting coatings for steel substrates, coil coatings, sealing gaskets for caps and closures of containers, or interior coatings of metal containers.

* * * * *